UNITED STATES PATENT OFFICE.

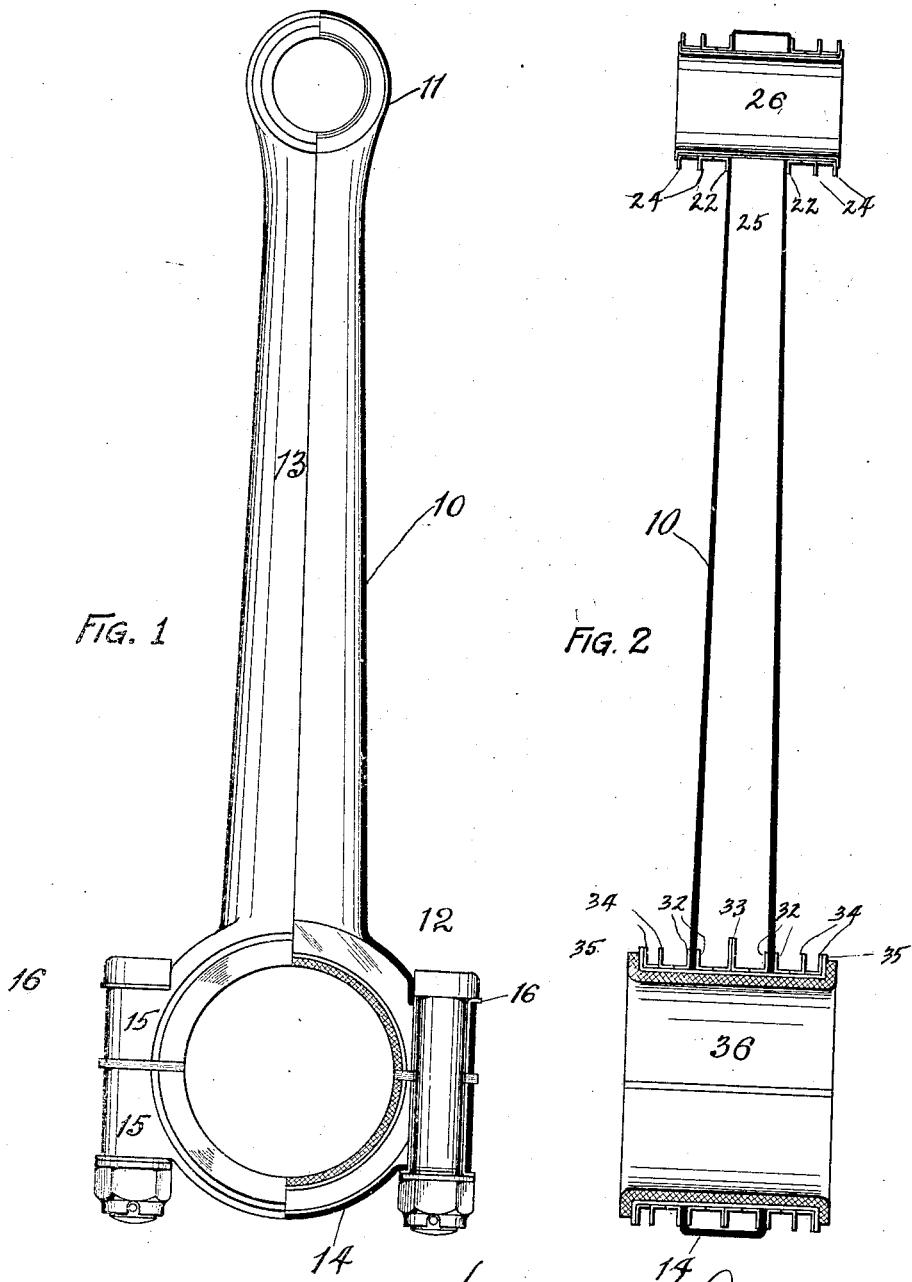

HEBRON BERNARD LAYMAN, OF NEW YORK, N. Y., ASSIGNOR TO THE LAYMAN PRESSED ROD COMPANY, INC., OF NEW YORK, N. Y., A CORPORATION OF NEW YORK.

CONNECTING-ROD.

1,340,173.     Specification of Letters Patent.     Patented May 18, 1920.

Application filed March 26, 1918. Serial No. 224,760.

*To all whom it may concern:*

Be it known that I, HEBRON BERNARD LAYMAN, a citizen of the United States, and residing at New York, in the county of New York and State of New York, have invented certain new and useful Improvements in Connecting-Rods, of which the following is a specification, such as will enable those skilled in the art to which it applies to make and use the same.

This invention relates to connecting rods, pitman rods, links, levers and the like, when fashioned from thin material, generally tubing or sheet metal—ferrous or non-ferrous—whether of many pieces or one piece, and whether jointed or jointless.

An object of the invention is to provide a connecting rod, or the like, which will be of extremely light weight, and especially suited to that particular service, where the rod, in the region of the junction of the shank with the crank end, is subjected to the highest stresses, which stresses gradually decrease from there to the piston end. This object is accomplished by the provision of a shell, preferably a unitary shell, one end of which, the pison end, is of lighter or thinner material than the other end, and the shank portion of which tapers in thickness from one end toward or to the other.

Other objects will appear hereafter in the specification and claims, clearly discernible to those skilled in this art.

In the accompanying drawing, by way of example only, the invention is shown as applied to the one-piece, jointless, hollow connecting rod shell, which is the subject of my co-pending application, Serial No. 91,566, filed April 17th, 1916, and the rod of this present invention as shown, is fabricated entirely and solely by the process fully described and shown in my co-pending application, Serial No. 93,052, filed April 24th, 1916, entitled "Method of making connecting rods."

Certain features of my invention are claimed broadly in my co-pending application Serial No. 224,758.

The invention may, with equal facility, be applied to other forms of connecting rods fashioned from relatively thin material, for example the rods disclosed in my co-pending applications, Serial Numbers—

157,273, filed March 24th, 1917,
161,399, " April 12th, "
161,729, " April 13th, "
162,727, " April 17th, "

or to those rods which are the subject matter of the United States Patents issued to me, Nos. 1,176,300, 1,176,302, 1,218,572 and 1,226,978.

Figure 1 is a side elevation, half in section, of a connecting rod, having a one piece sheet metal shell, embodying the feature of the invention;

Fig. 2 is a section at right angles of the rod in Fig. 1.

10 is the shell of the connecting rod, comprising a piston end portion 11 of very thin material, and a crank end portion 12 of relatively heavy material, connected by a shank portion 13 which tapers in thickness uniformly from one end to the other, and is thickest at the junction of the shank portion with the crank end.

The crank head end is provided with a cap 14, which, as described in my co-pending applications, Serial No. 91,566 and Serial No. 93,052, may be formed integral with the shell and subsequently be cut therefrom. The rod shell and cap are provided with bolt bosses 15 and fitted with liners 16.

The piston pin boss is principally composed of flanged bushings 22, which are welded to the sides of the shell, and the abutting flanged bushings 24, within all of which is a ferrule 25, which in turn is lined with a bearing metal bushing 26.

At the crank end, the flanged bushings 32 are welded to the inner and outer surfaces of the shell, and these with the flanged bushings 33 and 34 are lined with a flanged ferrule 35, all of which parts are welded together and to the rod shell by any desirable process. A bearing metal bushing 36 completes the construction of the crank end.

In my application entitled "Method of making connecting rods" previously referred to, Serial No. 93,052, I have, at great length, described and shown all of the steps of the process of making the connecting rod of this present invention.

Heretofore, I have used the word "shell" in referring to the main part of the connecting rod. By "shell" I mean the shank portion and one or both end portions integral therewith, exclusive of cap or flanged bushings, or liner bushing, or bolt boss bushings, or shank reinforcement, or similar small parts. My use of the word "shell" will apply with equal force to connecting rods with or without caps.

Where I use the term "sheet metal" hereinafter in the claims, I wish it understood that I mean any form of metal which partakes of the nature and characteristics of sheet metal, as distinguished from castings and forgings.

As distinguished from the present invention, in which the rod shell has one end of greater and one end of lesser thickness than the shank portion, I have described and claimed in my co-pending application, Serial Number 224,758, a connecting rod shell having end portions of greater thickness than the shank portion, and in my co-pending application, Serial Number 224,758, I have described and claimed a connecting rod shell with end portions of lesser thickness than the shank portion.

Having fully described my invention, what I claim as new and desire to secure by Letters Patent, is:

1. A sheet metal connecting rod shell, with a shank portion, the wall of which tapers in thickness from one end to the other.

2. A connecting rod having a one-piece sheet metal shell, the wall of which tapers in thickness from one end to the other.

3. A sheet metal connecting rod shell, having a longitudinally jointless, tubular shank, which tapers in thickness from one end to the other.

4. A sheet metal connecting rod shell, with one end portion of greater and one of lesser thickness than the shank portion.

5. A one piece sheet metal connecting rod shell, with an end portion of relatively thick metal, another end portion of relatively thin metal, and a shank portion which tapers in thickness from one end to the other.

6. A sheet metal connecting rod shell with a shank portion, the wall of which is thicker at one end than the other.

7. A sheet metal connecting rod shell with a shank portion, the wall of which is thicker at one end and thinner at the other end than in the center.

8. A sheet metal connecting rod shell, with one end portion of relatively thick metal, another end portion of relatively thin metal, and a shank portion which increases in thickness toward one end.

9. A sheet metal connecting rod shell, with one end portion of relatively thick metal, another end portion of relatively thin metal, and a shank portion of metal of varying thickness.

10. A connecting rod having a one-piece sheet metal shell comprising a shank portion and two end portions, one of which is of substantially thicker material than the other.

11. A sheet metal connecting rod shell with two head end portions, one of which is of substantially thicker metal than the other.

HEBRON BERNARD LAYMAN.

Witnesses:
M. C. MEYER,
L. D. WISE.